United States Patent [19]
Daval et al.

[11] Patent Number: 5,754,516
[45] Date of Patent: May 19, 1998

[54] MICROSTYLUS RECORDING DEVICE COVERED BY A MAGNETORESISTIVE MULTILAYER

[75] Inventors: Jacques Daval, Meylan; Bernard Bechevet, Claix, both of France

[73] Assignee: Commissariat A L'Energie Atomique, Paris, France

[21] Appl. No.: 762,424

[22] Filed: Dec. 9, 1996

[30] Foreign Application Priority Data

Dec. 15, 1995 [FR] France ................. 95 14897

[51] Int. Cl.⁶ ........................ G11B 7/00
[52] U.S. Cl. ........................ 369/126
[58] Field of Search ............ 369/126, 54, 58, 369/47, 44.11; 250/306, 307

[56] References Cited

U.S. PATENT DOCUMENTS 5,301,079  4/1994  Cain et al. .

FOREIGN PATENT DOCUMENTS

| 0 467 737 | 1/1992 | European Pat. Off. . |
| 0 551 814 | 7/1993 | European Pat. Off. . |
| 0 644 529 | 3/1995 | European Pat. Off. . |
| WO 89/07256 | 8/1989 | WIPO . |
| WO 92/14250 | 8/1992 | WIPO . |

OTHER PUBLICATIONS

IBM Technical Disclosure Bulletin, vol. 34, No. 3, pp. 124–125, Aug. 1991, R.T. Hodgson, et al., "Method For Creating Three–Dimensional Microstructures".

IBM Technical Disclosure Bulletin, vol. 34, No. 7B, pp. 365–367, Dec. 1, 1991, "High Density Magnetic Storage Using an Atomic Force Microscope with Optical Detection".

IBM Technical Disclosure Bulletin, vol. 37, No. 5, pp. 501–502, May 1994, "High–Density Magnetic Recording device By Using SXM Mechanism and Media with Discrete Cells".

Primary Examiner—Muhammed N. Edun
Attorney, Agent, or Firm—Oblon, Spivak, McClelland, Maier & Neustadt, P.C.

[57] ABSTRACT

Microstylus recording device covered by a magnetoresistive multilayer. According to the invention, a microstylus (12) is covered by a magnetoresistive layer (46).

2 Claims, 2 Drawing Sheets

MICROSTYLUS RECORDING DEVICE COVERED BY A MAGNETORESISTIVE MULTILAYER

DESCRIPTION

1. Technical Field

This invention relates to a microstylus recording device covered by a magnetoresistive layer.

The invention has applications in the recording of information on a support which may be used in television or computer memories.

2. State of the Prior Art

Knowledge already exists of the recording of information by means of a microstylus acting on an appropriate support. The expression "microstylus" is here understood to mean a mechanical (and not optical) stylus whose size is less than about one micrometer. These styluses are generally electrically conductive. A current circulating between such a stylus and a support causes a local heating of said support which may result in a modification of its structure, and, for example, cause it to pass from a crystalline state to an amorphous state. This is known as the reading operation. The subsequent measurement of the characteristic of the material, for example its conductivity, constitutes the reading operation.

This technique is called "phase shift recording". The stylus used in this case is of the sort found in the probes of Atomic Force Microscopes (AFM for short).

Another technique consists of using a recording support with a magnetic film and a probe of the sort found in Scanning Tunneling Microscopes (STM for short). A current impulse still passes in the stylus and across the magnetic film. The magnetic material is heated by Joule effect. A permanent magnetic field is applied by external means and allows the creation of a magnetization having a certain direction. If the film is heated above the Curie temperature of the material, the initial magnetization is destroyed.

On reading, the stylus treated in this way is distinguished from others by the direction of its magnetization.

According to yet another mechanism, a magnetic microstylus and the leakage magnetic field of the stylus may be used in combination with an external field to produce, in the magnetic field, a field in excess of the coercive field strength of the material and thus to impose a new magnetization orientation. Reading then consists of detecting the orientation of the magnetic field in the film. This detection may be performed optically, by measuring the rotation of the polarization plane of a laser beam.

Although satisfactory in some respects, the devices of the prior art making use of magnetic microstyluses have certain disadvantages, due in particular to fabrication difficulties and to lack of sensitivity.

This invention therefore aims to remedy these disadvantages.

DESCRIPTION OF THE INVENTION

To this end, the invention provides a recording device in which the microstylus is of a particular easy-to-make and highly sensitive kind. According to the invention, the microstylus consists of a nonmagnetic stylus covered by a magnetoresistive multilayer. Such a multilayer posses a resistance R whose value changes by a quantity $\Delta R$ for any variation of the magnetic field. It is thus possible to measure magnetic field variations when the microstylus travels across the surface of the recording support thanks to the measurement of the variation $\Delta R$ of the resistance of the microstylus. This is a well-known measurement requiring only standard means (current or voltage generator, voltage or current measuring means). In writing, a current circulates in the multilayer, for example in the form of a pulse, and penetrates the recording support where it creates local heating of the material so as to bring its temperature to a value in excess of the Curie temperature. By simultaneously applying a magnetic field, it is thus possible to write an information bit in the support. According to the invention, the magnetoresistive multilayer thus serves for both reading and writing operations.

Specifically, this invention relates to a recording device comprising:

at least one microstylus, a recording support possessing a magnetic film having locally a certain magnetization, means of relative movement of the microstylus and the support, writing means capable of heating the magnetic film and of modifying the magnetization direction of a zone of the film placed facing a stylus, reading means capable of determining the magnetization direction of the zone located facing the microstylus, this device being characterized in that the microstylus is in nonmagnetic material and is covered by a magnetoresistive multilayer, the reading means being capable of measuring the resistance variation of the magnetoresistive multilayer, and the writing means being capable of circulating a current through the magnetoresistive multilayer and into the magnetic film.

The magnetoresistive layer is preferentially a multilayer.

DETAILED DESCRIPTION OF THE EMBODIMENTS

Figure 1:
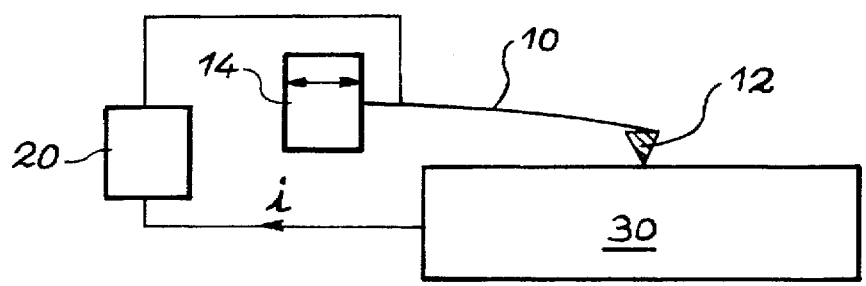
FIG. 1 is a reminder of the structure of a microstylus recording device.

FIG. 1 shows a recording device comprising, at the extremity of a flexible arm 10, a microstylus 12, the whole being capable of moving in one or two directions through means 14. A power and measuring circuit 20 is connected to the arm 10. A recording support 30 is placed under the microstylus 12. Writing is carried out point by point on the support, by moving the stylus after each reading. Reading is also carried out point by point with lateral movement.

Figure 2A:
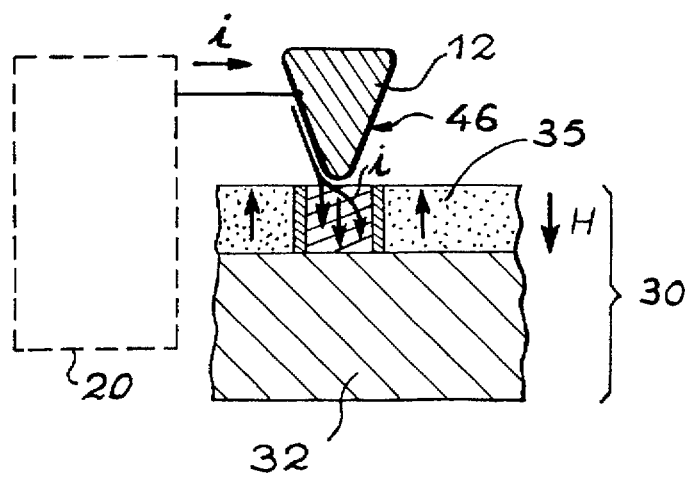
FIG. 2A illustrates in diagram form the writing operation and FIG. 2B the reading operation according to the invention.
Figure 2B:
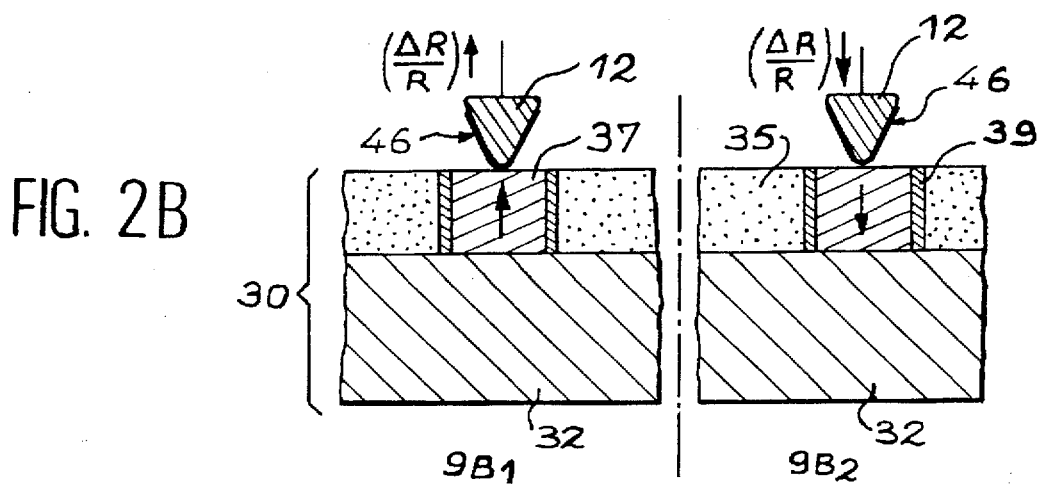

FIGS. 2A and 2B illustrate the writing and reading operations in the context of the invention. FIG. 2A shows a nonmagnetic stylus 12 covered by a magnetoresistive multilayer 46. This stylus is positioned facing a recording support 30 consisting of a substrate 32 covered by a magnetic film 35. An external magnetic field H is constantly applied. The magnetization of the layer 35 may either be parallel to the magnetic field H, or antiparallel. This magnetization is obtained by causing a current to circulate in the multilayer 46 and the layer 35. This current provokes local heating in the film 35 which carries the temperature of said film beyond the Curie temperature. The application of the external field H now imposes a magnetic field of the same direction in the film.

For the purposes of reading such a support, according to a characteristic of the invention, the leakage field of the recording support is detected by means of the magnetoresistive multilayer. Its relative resistance variation, that is to say $\Delta R/R$, is positive or negative according to whether the magnetization of the film 35 facing the stylus is oriented in one direction or the other. FIG. 2B thus shows two zones 37 and 39 where the magnetizations are in opposite directions and where the variations of $\Delta R/R$ in the multilayer 46 are also opposed.

Figure 3:
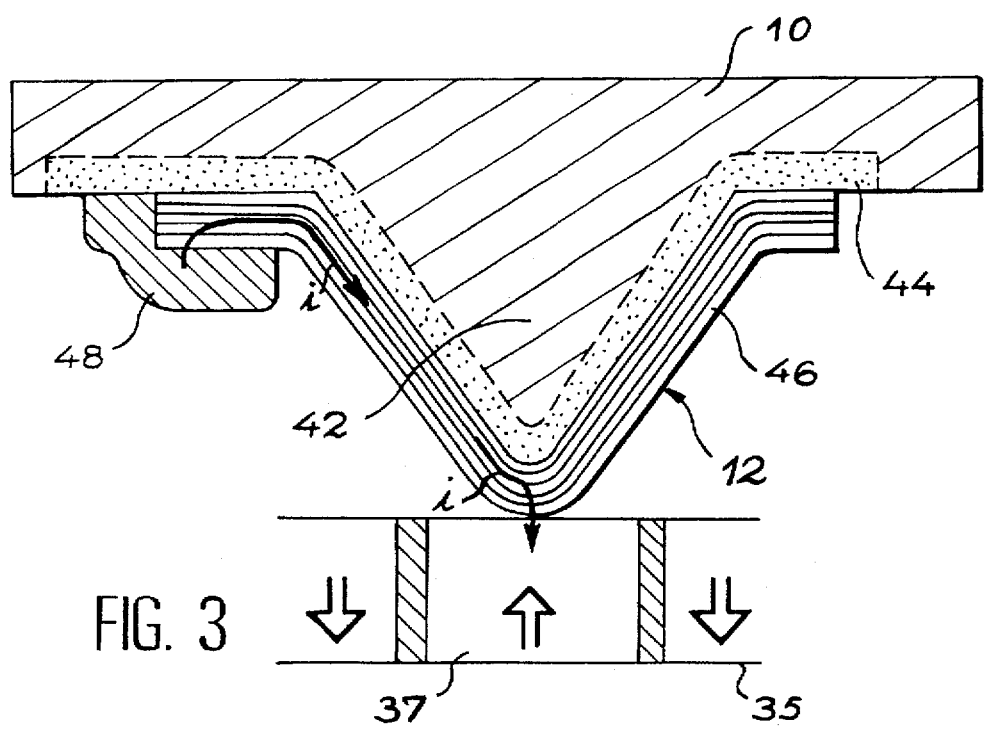
FIG. 3 is a cross section view of a microstylus according to the invention.

FIG. 3 shows in greater detail the structure of the stylus with its magnetoresistive multilayer. In the example illustrated, the arm 10 may for example be partly in silicon with a part etched according to the crystallographic planes of the silicon so as to form a pyramidal nonmagnetic microstylus 42. An insulating layer 44, for example in $SiO_2$ or $Si_3N_4$, has been deposited on this microstylus, said layer itself being covered with a magnetoresistive multilayer 46. At the base of each microstylus is a contact block 48 for electrical connection allowing the current i required for writing to be injected.

The magnetoresistive layer 46 is preferentially a multilayer of the spin-valve type, also known as giant magnetoresistance. The layers may, for example, be a packing of NiFe/Cu/iFe/FeMn/Fe.

Figure 4A:
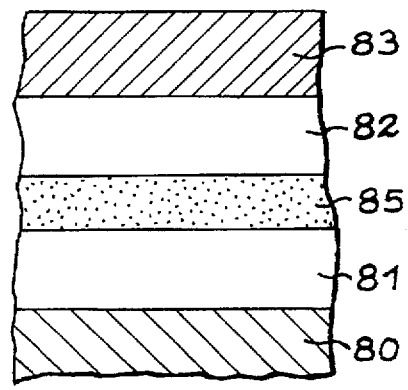
FIG. 4A shows an example of a magnetoresistive multilayer and FIG. 4B a relative variation diagram of the resistance in function of the magnetic field applied.
Figure 4B:
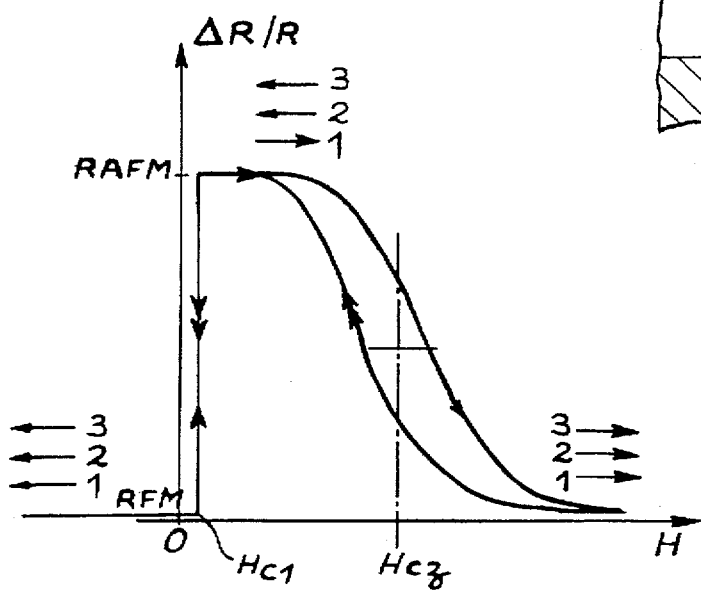

FIGS. 4A and 4B help to provide a better understanding of the working of such a microstylus with multilayer magnetoresistance. The magnetoresistance is represented functionally in FIG. 4A with a substrate 80, a layer 81 in a first soft magnetic material, a second insulating layer 85, a third layer 82 in a second soft magnetic material, and lastly a layer 83 in a third, antiferromagnetic-type magnetic material.

The relative resistance variations $\Delta R/R$ are represented in FIG. 4B in function of the magnetic field H applied and coming from the recording support. The arrows marked 1, 2 and 3 correspond to the magnetizations in the layers 81, 82 and 83 represented in FIG. 4A. When the field is strong or negative, the three magnetizations are parallel (ferromagnetic range FM). In the median range, the magnetization of the layer 81 is antiparallel to that of the others (antiferromagnetic range AFM). The $\Delta R/R$ cycle in function of H is now in the form of a staircase step with an $\Delta R/R$ switching abruptly from a value $R_{FM}$ to another value $R_{AFM}$ around a weak and slightly positive critical field $Hc_1$, ($0<Hc_1<1$ Oerstedt). The leakage field of the recording medium is at least equal to this critical field $Hc_1$; the variation $\Delta R/R$ is read by the magnetoresistance.

The invention described above may be used whatever the structure and the number of microstyluses. In particular, it may be used in a device comprising a plurality of microstyluses distributed in lines or in a matrix.

We claim:

1. A recording device comprising:
    at least one microtip having a non-magnetic base portion covered by a magnetoresistive multilayer portion;
    a magnetic recording medium including a substrate carrying a magnetic film on an upper surface facing said microtip, said magnetic film having a particular magnetic orientation;
    a mechanism establishing relative movement between said microtip and said magnetic recording medium;
    an information writing source supplying a current to said magnetoresistive multilayer portion for circulation through said magnetoresistive multilayer portion and into said magnetic film to provide a heated zone in said magnetic film adjacent to the microtip, said heated zone being exposed to a magnetization field causing the particular magnetic orientation of the magnetic film in the heated zone to be modified; and
    a reading arrangement determining the magnetization orientation of individual locations along the magnetic film as each location is positioned adjacent to the microtip, said reading arrangement measuring a resistance variation in the magnetoresistive multilayer portion overlying each said location, said variation indicating the magnetization orientation of each said location.

2. The device according to claim 1, wherein said magnetoresistive multilayer portion comprises a spin-valve magnetoresistive multilayer portion.

* * * * *